United States Patent
McAuliffe et al.

(10) Patent No.: US 9,890,872 B2
(45) Date of Patent: Feb. 13, 2018

(54) PISTON FOR PNUEMATIC ACTUATOR IN HIGH VIBRATION ENVIRONMENT

(71) Applicant: Hamilton Sundstrand Corporation, Windsor Locks, CT (US)

(72) Inventors: Christopher McAuliffe, Windsor, CT (US); Josh Kamp, Glastonbury, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 53 days.

(21) Appl. No.: 14/736,855

(22) Filed: Jun. 11, 2015

(65) Prior Publication Data

US 2016/0363233 A1    Dec. 15, 2016

(51) Int. Cl.
| | |
|---|---|
| *F16K 31/122* | (2006.01) |
| *F16K 31/52* | (2006.01) |
| *F15B 15/06* | (2006.01) |
| *F15B 15/14* | (2006.01) |
| *B23P 15/10* | (2006.01) |

(52) U.S. Cl.
CPC ............ *F16K 31/122* (2013.01); *B23P 15/10* (2013.01); *F15B 15/066* (2013.01); *F15B 15/1447* (2013.01); *F15B 15/1457* (2013.01); *F16K 31/52* (2013.01)

(58) Field of Classification Search
CPC ............... F16K 31/122; F16K 31/1221; F16K 31/1223; F16K 31/1225; F16K 31/1226; F16K 31/1228; F16K 31/124; F16K 31/1245; F16K 47/00; F16K 31/52; F16K 31/521; F16K 31/52441; B23P 15/10; F15B 15/1457; F15B 15/1447

USPC ................................... 251/62, 63, 63.4, 63.5
See application file for complete search history.

(56) References Cited

U.S. PATENT DOCUMENTS

| | | | |
|---|---|---|---|
| 3,145,662 A | 8/1964 | Eickmann | |
| 3,146,681 A * | 9/1964 | Sheesley | F15B 15/066 92/13.5 |
| 3,452,961 A * | 7/1969 | Forsman | F15B 15/066 251/232 |
| 3,760,480 A | 9/1973 | Tupker | |
| 4,882,977 A | 11/1989 | Himeno et al. | |
| 4,967,702 A * | 11/1990 | Richeson | F01L 9/04 123/90.14 |
| 5,000,077 A * | 3/1991 | Habicht | F15B 15/066 74/104 |
| 5,228,640 A | 7/1993 | Mouille | |

(Continued)

FOREIGN PATENT DOCUMENTS

| | | |
|---|---|---|
| FR | 2133249 A5 | 11/1972 |
| GB | 615386 | 1/1949 |

OTHER PUBLICATIONS

Extended European Search Report, for European Patent Application No. 16173168.2, dated Nov. 2, 2016, 9 pages.

*Primary Examiner* — Ian Paquette
(74) *Attorney, Agent, or Firm* — Kinney & Lange, P.A.

(57) ABSTRACT

A piston assembly includes a piston with a first cap disposed on a first end of the piston and a second cap disposed on a second end of the piston. A piston cross-member is in between the first cap and the second cap. A first cover is affixed to a first side of the piston cross-member. A second cover is affixed to a second side of the piston cross-member. The second side of the piston cross-member is opposite the first side of the piston cross-member.

16 Claims, 3 Drawing Sheets

(56) References Cited

U.S. PATENT DOCUMENTS

| | | | |
|---|---|---|---|
| 5,406,916 A | | 4/1995 | Rodrigues |
| 6,076,799 A | * | 6/2000 | Baumann ............ F16K 31/5282 251/285 |
| 6,959,795 B2 | | 11/2005 | Kienholz |
| 2013/0270415 A1 | | 10/2013 | Lee et al. |

* cited by examiner

PISTON FOR PNUEMATIC ACTUATOR IN HIGH VIBRATION ENVIRONMENT

BACKGROUND

The present disclosure is directed generally to butterfly valves, and more specifically, to pistons used for actuation of butterfly valves.

Pneumatically actuated butterfly valves require a means for translating the pistons axial motion into rotary motion to control the position of the valve disc which is used to modulate the primary air flow. Typically a link with bearings at each end provides the connection between the piston and the crank arm which rotates the shaft for the butterfly disc. Often there are wear issues associated with the bearings at either end of the crank. Also, in high vibration environments like engine bleed systems, a piston torsional mode may be excited which leads to excessive piston ring wear. In such arrangements, the piston has the rotational inertia and the link provides the torsional stiffness.

SUMMARY

A piston assembly includes a piston with a first cap disposed on a first end of the piston and a second cap disposed on a second end of the piston. A piston cross-member is in between the first cap and the second cap. A first cover is affixed to a first side of the piston cross-member. A second cover is affixed to a second side of the piston cross-member. The second side of the piston cross-member is opposite the first side of the piston cross-member.

A piston assembly includes a piston with a first cap disposed on a first end of the piston and a second cap disposed on a second end of the piston. A piston rod is in between the first cap and the second cap. A first cover is affixed to a first side of the piston rod. The first cover includes a first cutout and a first slot. A second cover is affixed to a second side of the piston rod. The second cover includes a second cutout and a second slot. The second side of the piston rod is opposite the first side of the piston rod. A crank mechanism includes a shaft and a crank. A first end of the crank is affixed to the shaft. A second end of the crank is slidably and rotationally engaged with a third slot in the piston rod.

A method of assembling a piston assembly includes disposing a first cap onto a first end of a piston and a second cap onto a second end of the piston. A piston rod is positioned in between the first cap and the second cap. A first cover is affixed to a first side of the piston rod. A second cover is affixed to a second side of the piston rod. The second side of the piston rod is positioned opposite the first side of the piston rod. A Scotch yoke crank mechanism including a shaft and a crank is attached to the piston rod.

DETAILED DESCRIPTION

Figure 1:
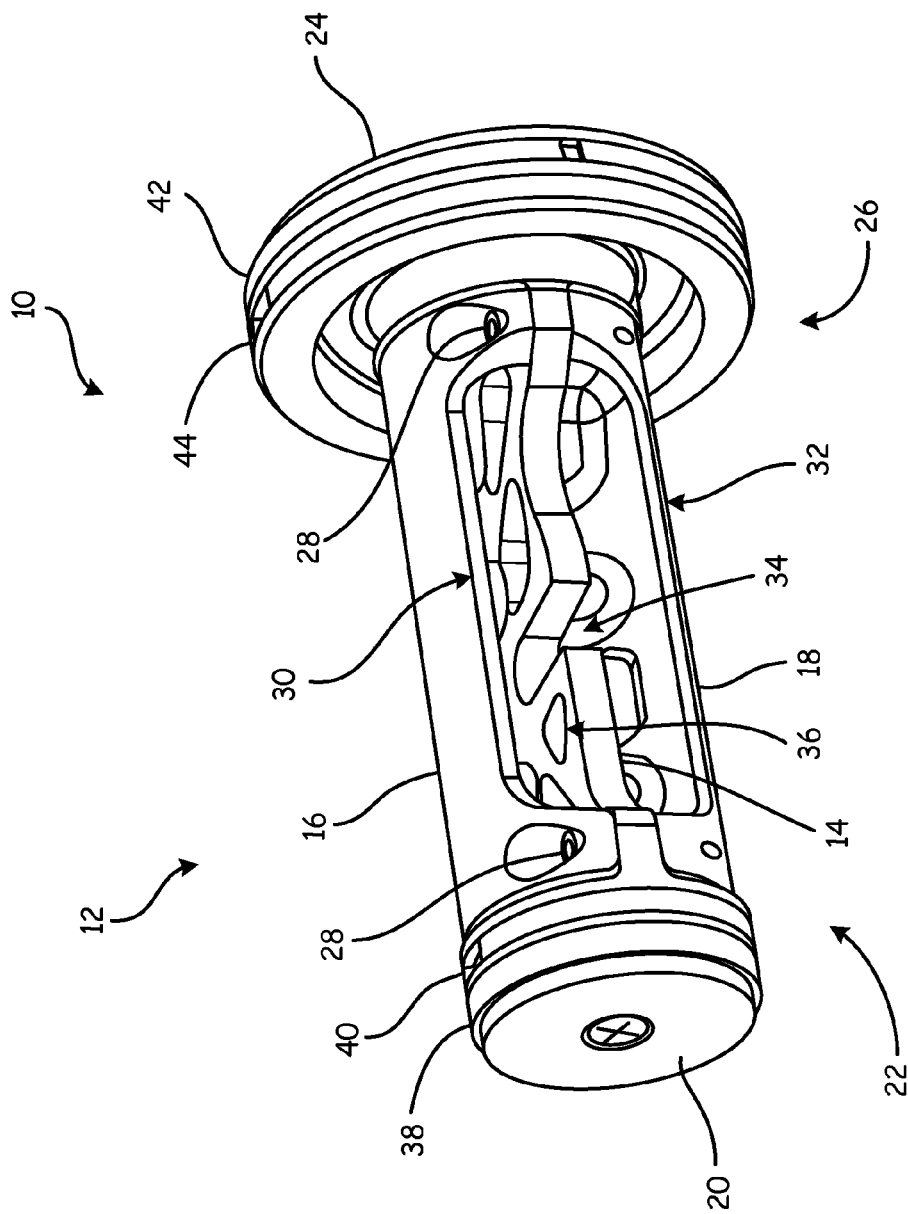
FIG. 1 is a perspective view of a piston assembly.

FIG. 1 is a perspective view of piston assembly 10. Piston assembly 10 generally includes piston 12, piston rod 14, first cover 16, and second cover 18. First cap 20 is positioned at first end 22 of piston 12, and second cap 24 is positioned at second end 26 of piston 12. First cap 20 can be attached to first end 22 of piston 12 by various attachment means, which may include threaded engagement, brazing, welding, and/or other types of mechanical or chemical adhesion. Piston assembly 10 can be used in a pneumatic butterfly valve for use in engine bleed air systems and/or other types of fluid valve arrangements. Piston assembly 10 often is positioned in systems which translate vibrational energy to piston assembly 10.

First cover 16 and second cover 18 are detachably affixed to piston rod 14 by fasteners, which may include threaded fasteners such as threaded screws 28. Threaded screws 28 can include high-strength threaded fasteners. First cover 16 and second cover 18 provide an increase in stiffness to piston 12 by absorbing and/or damping vibrations experienced by piston assembly 10 during operation of piston assembly 10. First cover 16 and second cover 18 dampen vibrations experienced by piston assembly 10 by adding support to piston rod 14 along the areas where first cover 16 and second cover 18 come into contact with piston rod 14. The additional support to piston rod 14 from first cover 16 and second cover 18 decreases the amount of torsional strain on piston 12 due to operating environment vibrations experienced by piston assembly 10. When assembled, piston rod 14, first cover 16, and second cover 18 can generally include a cylindrical shape, and may include other shapes designed to optimize the vibrational characteristics of piston assembly 10. The outer diameters of both first cover 16 and second cover 18 are slightly smaller than the width of piston rod 14 for a proper tolerance stack-up allowing piston 12 to fit within a bore of a pump without coming into contact with the bore during operation of the pump.

Specifically, the addition of first cover 16 and second cover 18 increases the natural frequency of piston 12. The natural frequency, or the frequency at which an object tends to oscillate in the absence of a driving or damping force, of piston 12 without the covers can be between 100-1,150 hz. This can be a problem because the typical vibrational mode of the operating environment surrounding piston assembly 10 can include torsional modes within the range of 100-1,150 hz. When the natural frequency of piston 12 falls within the torsional mode range of the operating environment, the amplitude of the torsional mode of piston 12 can increase drastically causing potential wear and potential damage to piston 12 and other components of piston assembly 10.

The addition of first cover 16 and second cover 18 to piston 12 results in increasing a natural frequency of piston 12 and piston assembly 10 to at least 2,000 hz. Specifically, the natural frequency of piston 12 and piston assembly 10 may be increased to greater than 2,300 hz with the addition of first cover 16 and second cover 18 to piston 12.

A benefit of attaching first cover 16 and second cover 18 to piston 12 is to increase the resonant frequencies associated with piston 12 and piston assembly 10 to well above any frequency source in the valve operating environment. This increase in natural frequency of piston 12 significantly reduces the wear typically seen in high vibration environments where piston assembly 10 will be used and will also reduce piston ring wear and crank mechanism wear.

First cover 16 includes first cutout 30 and second cover 18 includes second cutout 32. As will be discussed with respect to FIGS. 3A-3B, first cutout 30 and second cutout 32 will allow a crank mechanism to engage and operate with piston assembly 10.

Piston rod 14 also includes slot 34 on one side of piston rod 14. Slot 34 is open on a side of piston rod 14 to receive a crank mechanism, as show in FIGS. 3A-3B. To further reduce weight, portions of piston rod 14 can optionally be hollowed out defining one or more cavities 36. The location, size, and shape of cavities 36 can also be designed to optimize the vibrational characteristics of piston 12 and piston assembly 10. Although referred to as a rod in this embodiment, piston rod 14 may include a flat cross-member with a flat bore extending between first cap 20 and second cap 24.

Piston assembly 10 also includes first piston ring 38 and first rider ring 40 located at first end 22 of piston 12. Additionally, piston assembly 10 also includes second piston ring 42 and second rider ring 44 located at second end 26 of piston 12. First piston ring 38, first rider ring 40, second piston ring 42, and second rider ring 44 form a seal with the valve (not shown) to create a sealed environment within the valve.

Figure 2:
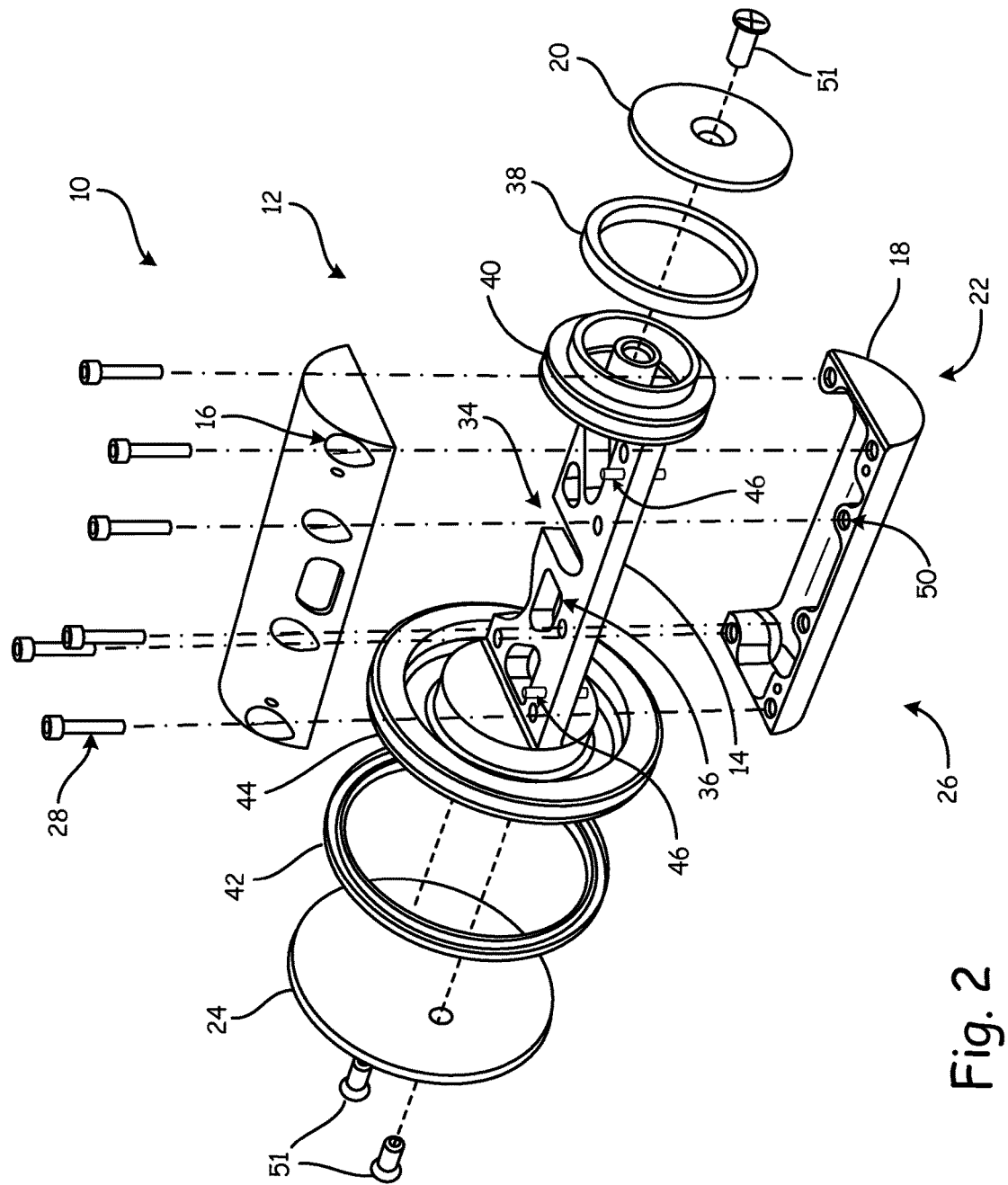
FIG. 2 is an exploded perspective view of a piston assembly.

FIG. 2 is an exploded perspective view of piston assembly 10. As shown in FIG. 2, piston rod 14 also includes dowel pins 46. Dowel pins 46 engage with first cover 16 and second cover 18 to ensure correct alignment with piston rod 14.

First cover 16 includes plurality of thru-holes 48. Threaded screws 28 pass through plurality of thru-holes 48 and threadably engage into plurality of locking inserts 50 positioned in second cover 18. The quantity and positioning of thru-holes 48 and locking inserts 50 can be determined based on desired operational and functional characteristics of piston assembly 10 such as optimization of torsional damping, natural frequency, crank mechanics, and other performance characteristics of piston assembly 10. Piston assembly 10 may also include fasteners 51 to secure first cap 20 to first end 22 and second cap 24 to second end 26 of piston 12.

The surface of piston rod 14 interfaces with first cover 16 and second cover 18 along a peripheral edge of first cover 16 and second cover 18. The size and shape of the interface between piston rod 14 and first cover 16 and second cover 18 is configured to control the vibrational damping and/or absorbing effect of first cover 16 and second cover 18. A larger amount of surface area of first cover 16 and second cover 18 that comes into contact with piston rod 14 will increase the vibrational damping and/or absorbing effect of first cover 16 and second cover 18 on piston assembly 10. A smaller amount of surface area of first cover 16 and second cover 18 that comes into contact with piston rod 14 will decrease the vibrational damping and/or absorbing effect of first cover 16 and second cover 18 on piston assembly 10.

Piston 12, piston rod 14, first cover 16, and second cover 18 can all include metal materials, such as Inconel 718, Inconel 625, steel, titanium, alloys, superalloys, and/or other various types of metals.

Figures 3A, 3B:
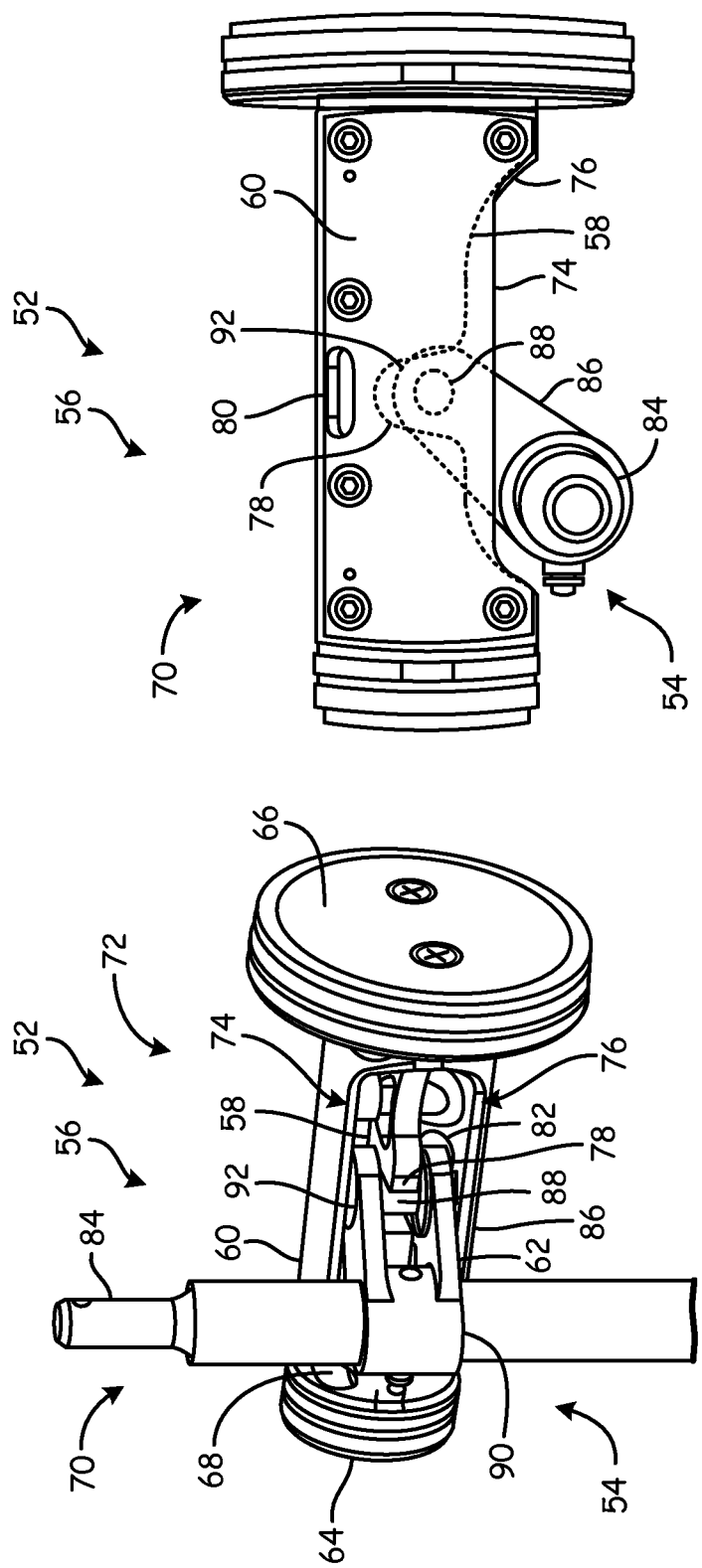
FIG. 3A is a perspective view of a piston assembly with a crank mechanism.
FIG. 3B is a top plan view of a piston assembly with a crank mechanism.

FIG. 3A is a perspective view of piston assembly 52 with crank mechanism 54. Piston assembly 52 includes piston 56, piston cross-member 58, first cover 60, second cover 62, first cap 64, and second cap 66. First cover 60 and second cover 62 are detachably affixed to piston cross-member 58 with threaded screws 68. First cap 64 is attached to first end 70 of piston 56 and second cap 66 is attached to second end 72 of piston 56. First cover 60 includes first cutout 74 and second cover 62 includes second cutout 76. Piston cross-member 58 includes engagement slot 78 which is configured to attach piston 56 to crank mechanism 54. First cover 60 includes first slot 80 (not shown in FIG. 3A) and second cover 62 includes second slot 82.

Crank mechanism 54 includes shaft 84, crank arm 86, and crank pin 88. First end 90 of crank arm 86 is connected to shaft 84. Second end 92 of crank arm is includes crank pin 88 for engagement with engagement slot 78 of piston cross-member 58. Crank pin 88 slidably and rotationally engages with engagement slot 78 of piston cross-member 58 to enable linear actuation of piston 56 within a bore of a valve (not shown). Crank pin 88 rotates relative to crank arm 86 and slides relative to engagement slot 78. This type of crank mechanism is commonly known as a Scotch yoke crank mechanism.

FIG. 3B is a top plan view of piston assembly 52 with crank mechanism 54. First slot 80 and second slot 82 (not shown in FIG. 3B) provide clearance for second end 92 of crank arm 86 to extend through first cover 60 and second cover 62 during operation of piston assembly 52. As piston 56 actuates linearly in a valve, the position of shaft 84 will slide back and forth along piston 56. As shaft 84 slides back and forth along piston 56, crank pin 88 slides along engagement slot 78 of piston cross-member 58. As crank pin 88 slides along engagement slot 78 of piston cross-member 58, second end 92 of crank arm 86 extends out of first cover 60 and second cover 62 through first slot 80 and second slot 82, respectively.

First cutout 74 and second cutout 76 provide an opening in first cover 60 and second cover 62 for crank arm 86 to enter into piston 56 and engage with engagement slot 78 of piston cross-member 58. Additionally, the openings in first cutout 74 and second cutout 76 provide clearance for shaft 84 during actuation of piston assembly 52. As can be seen in the top plan view of piston assembly 52 in FIG. 3B, the shape of first cutout 74 and second cutout 76 allow shaft 84 to actuate along a path inset from an outer diameter of piston cross-member 58 and/or first end 70 of piston 56.

Piston 56, piston-cross member 58, first cover 60, second cover 62, and crank mechanism 54 can all include metal materials, such as Inconel 718, Inconel 625, steel, titanium, alloys, superalloys, and/or other various types of metals.

DISCUSSION OF POSSIBLE EMBODIMENTS

The following are non-exclusive descriptions of possible embodiments of the present disclosure.

A piston assembly may include a piston with a first cap disposed on a first end of the piston and a second cap disposed on a second end of the piston. A piston cross-member may be between the first cap and the second cap. A first cover may be affixed to a first side of the piston cross-member. A second cover may be affixed to a second side of the piston cross-member. The second side of the piston cross-member may be opposite the first side of the piston cross-member.

The piston assembly of the preceding paragraph can optionally include, additionally and/or alternatively, any one or more of the following features, configurations and/or components:

a further embodiment of the foregoing piston assembly, wherein the piston assembly may be attached to a crank mechanism including a shaft and a crank;

a further embodiment of the foregoing piston assembly, wherein the piston assembly may further include a first cutout in the first cover and a second cutout in the second cover;

a further embodiment of the foregoing piston assembly, wherein a first end of the crank may be affixed to the shaft, and a second end of the crank may be slidably and rotationally engaged with a slot in the piston cross-member;

a further embodiment of the foregoing piston assembly, wherein the piston cross-member may include at least one cavity;

a further embodiment of the foregoing piston assembly, wherein the piston cross-member, the first cover, and the second cover may form a first portion of the piston that may include a cylindrical shape;

a further embodiment of the foregoing piston assembly, wherein the piston may include a natural frequency of at least 2,000 hz;

a further embodiment of the foregoing piston assembly, wherein the piston may include a natural frequency of at least 2,300 hz;

a further embodiment of the foregoing piston assembly, wherein at least one of the first cover and the second cover may be affixed to the piston by at least one threaded screw;

a further embodiment of the foregoing piston assembly, wherein at least one of the first cover and the second cover may be detachable with the piston; and/or a further embodiment of the foregoing piston assembly, wherein the crank mechanism includes a Scotch yoke crank mechanism;

An alternative embodiment of a piston assembly may include a piston with a first cap disposed on a first end of the piston and a second cap disposed on a second end of the piston. A piston rod may be between the first cap and the second cap. A first cover may be affixed to a first side of the piston rod. The first cover may include a first cutout and a first slot. A second cover may be affixed to a second side of the piston rod. The second cover may include a second cutout and a second slot. The second side of the piston rod may be opposite the first side of the piston cross-member. A crank mechanism may include a shaft and a crank. A first end of the crank may be affixed to the shaft. A second end of the crank may be slidably and rotationally engaged with a third slot in the piston rod.

The piston assembly of the preceding paragraph can optionally include, additionally and/or alternatively, any one or more of the following features, configurations and/or additional components:

a further embodiment of the foregoing piston assembly, wherein the piston rod, the first cover, and the second cover may form a first portion of the piston that may include a cylindrical shape;

a further embodiment of the foregoing piston assembly, wherein the piston may include a natural frequency of at least 2,000 hz;

a further embodiment of the foregoing piston assembly, wherein the piston may include a natural frequency of at least 2,300 hz;

a further embodiment of the foregoing piston assembly, wherein at least one of the first cover and the second cover may be affixed to the piston by at least one threaded screw; and a further embodiment of the foregoing piston assembly, wherein at least one of the first cover and the second cover are detachable with the piston.

A method of assembling a piston assembly may include disposing a first cap onto a first end of a piston and a second cap onto a second end of the piston. A piston rod may be positioned in between the first cap and the second cap. A first cover may be affixed to a first side of the piston rod. A second cover may be affixed to a second side of the piston rod. The second side of the piston rod may be positioned opposite the first side of the piston rod. A Scotch yoke crank mechanism that may include a shaft and a crank may be attached to the piston rod.

The method of assembling a piston assembly of the preceding paragraph can optionally include, additionally and/or alternatively, any one or more of the following features, configurations and/or additional components:

a further embodiment of the foregoing method of assembling a piston assembly, wherein attaching a Scotch yoke crank mechanism may include slidably and rotationally engaging a first end of the crank with a slot in the piston rod and affixing a second end of the crank to the shaft; and a further embodiment of the foregoing method of assembling a piston assembly may include setting a natural frequency of the piston assembly to at least 2,000 hz.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston assembly comprising:
a piston including a first cap disposed on a first end of the piston and a second cap disposed on a second end of the piston;
a piston cross-member in between the first cap and the second cap;
a first cover affixed to a first side of the piston cross-member;
a second cover affixed to a second side of the piston cross-member, wherein the second side of the piston cross-member is opposite the first side of the piston cross-member;
a first cutout in the first cover; and
a second cutout in the second cover, wherein the piston assembly is attached to a crank mechanism including a shaft and a crank, wherein the shaft is disposed externally of the first cover and the second cover, wherein the crank arm extends through the first cutout and the second cutout, and further wherein a first end of the crank is affixed to the shaft, and a second end of the crank is slidably and rotationally engaged with a slot in the piston cross-member.

2. The piston assembly of claim 1, wherein the piston cross-member includes at least one cavity.

3. The piston assembly of claim 1, wherein the piston cross-member, the first cover, and the second cover form a first portion of the piston that includes a cylindrical shape.

4. The piston assembly of claim 1, wherein at least one of the first cover and the second cover are affixed to the piston by at least one threaded screw.

5. The piston assembly of claim 1, wherein at least one of the first cover and the second cover are detachable with the piston.

6. The piston assembly of claim 1, wherein the crank mechanism includes a Scotch yoke crank mechanism.

7. The piston assembly of claim 1, wherein the piston includes a natural frequency of at least 2,000 hz.

8. The piston assembly of claim 7, wherein the piston includes a natural frequency of at least 2,300 hz.

9. A piston assembly comprising:
a piston including a first cap disposed on a first end of the piston and a second cap disposed on a second end of the piston;
a piston rod in between the first cap and the second cap;
a first cover affixed to a first side of the piston rod, the first cover including a first cutout and a first slot;
a second cover affixed to a second side of the piston rod, the second cover including a second cutout and a second slot, wherein the second side of the piston rod is opposite the first side of the piston rod; and
a crank mechanism including a shaft and a crank, wherein the shaft is disposed externally of the first cover and the second cover, wherein the crank arm extends through the first cutout and the second cutout, wherein a first end of the crank is affixed to the shaft, and wherein a second end of the crank is slidably and rotationally engaged with a third slot in the piston rod.

10. The piston assembly of claim 9, wherein the piston rod, the first cover, and the second cover form a first portion of the piston that includes a cylindrical shape.

11. The piston assembly of claim 9, wherein at least one of the first cover and the second cover are affixed to the piston by at least one threaded screw.

12. The piston assembly of claim 9, wherein at least one of the first cover and the second cover are detachable with the piston.

13. The piston assembly of claim 9, wherein the piston includes a natural frequency of at least 2,000 hz.

14. The piston assembly of claim 13, wherein the piston includes a natural frequency of at least 2,300 hz.

15. A method of assembling a piston assembly, the method comprising:
disposing a first cap onto a first end of a piston and a second cap onto a second end of the piston;
positioning a piston rod in between the first cap and the second cap;
affixing a first cover to a first side of the piston rod;
affixing a second cover to a second side of the piston rod, wherein the second side of the piston rod is positioned opposite the first side of the piston rod; and
attaching a Scotch yoke crank mechanism including a shaft and a crank to the piston rod, wherein the shaft is disposed externally of the first cover and the second cover, wherein the crank arm extends through the first cutout and the second cutout, and wherein attaching a Scotch yoke crank mechanism includes slidably and rotationally engaging a first end of the crank with a slot in the piston rod and affixing a second end of the crank to the shaft.

16. The method of claim 15 further including setting a natural frequency of the piston assembly to at least 2,000 hz.

* * * * *